United States Patent
Taira et al.

(10) Patent No.: US 7,156,445 B2
(45) Date of Patent: Jan. 2, 2007

(54) SEALING MECHANISM FOR CONVERTIBLE TOP OF VEHICLE

(75) Inventors: Yoshifumi Taira, Kaita-cho (JP); Hiroki Tanoue, Fuchu-cho (JP)

(73) Assignees: Toyo Seat Co., Ltd., Osaka (JP); Mazda Motor Corporation, Hiroshima (JP)

( * ) Notice: Subject to any disclaimer, the term of this patent is extended or adjusted under 35 U.S.C. 154(b) by 0 days.

(21) Appl. No.: 11/354,906

(22) Filed: Feb. 16, 2006

(65) Prior Publication Data

US 2006/0186693 A1    Aug. 24, 2006

(30) Foreign Application Priority Data

Feb. 23, 2005   (JP)   ............... 2005-046446

(51) Int. Cl.
*B60J 7/00*   (2006.01)
(52) U.S. Cl. ................................ 296/107.04
(58) Field of Classification Search ........... 296/107.04, 296/107.01
See application file for complete search history.

(56) References Cited

U.S. PATENT DOCUMENTS

| 4,750,778 | A | * | 6/1988 | Hoban | ........................ 296/66 |
|---|---|---|---|---|---|
| 5,918,928 | A | * | 7/1999 | Kolb et al. | ............ 296/107.04 |
| 6,030,022 | A | * | 2/2000 | Bormann et al. | ...... 296/107.04 |
| 6,213,536 | B1 | * | 4/2001 | Raisch et al. | ............ 296/146.9 |
| 6,561,565 | B1 | * | 5/2003 | Langguth et al. | ...... 296/107.04 |
| 2002/0093217 | A1 | * | 7/2002 | Langguth et al. | ...... 296/107.04 |

FOREIGN PATENT DOCUMENTS

| JP | 02-019627 | 2/1990 |
|---|---|---|
| JP | 05-026567 | 4/1993 |
| JP | 08-207595 | 8/1996 |

* cited by examiner

*Primary Examiner*—Hilary Gutman
(74) *Attorney, Agent, or Firm*—Nixon Peabody LLP; Donald R. Studebaker

(57) ABSTRACT

Disclosed is a sealing mechanism for a convertible top of a vehicle, which comprises a sealing cloth 27 disposed inside a lateral edge of a side zone 22 of a top fabric 9 in such a manner as to be gradually inclined toward the laterally inward side of the convertible top, as going from a front side to a rear side in a deployment direction of the convertible top 3. The sealing cloth 27 is designed to be brought into contact with a weather strip 41 in a deployed position. The sealing mechanism of the present invention can ensure high-level sealing between the top fabric and a top frame in a lateral edge of the convertible top.

3 Claims, 4 Drawing Sheets

SEALING MECHANISM FOR CONVERTIBLE TOP OF VEHICLE

BACKGROUND OF THE INVENTION

1. Field of the Invention

The present invention relates to a sealing mechanism for a convertible top of a vehicle, and more particularly to a mechanism for sealing between a top fabric and a top frame in a lateral edge of a convertible top.

2. Description of the Background Art

In a vehicle equipped with a convertible top adapted to be selectively opened and closed, it is important to adequately seal between a top frame and a top fabric.

A sealing mechanism required for a convertible top is varied depending on systems for moving the convertible top. For example, Japanese Utility Model Laid-Open Publication No. 05-26567 discloses a sealing mechanism for a convertible top adapted to be selectively opened and closed. This sealing mechanism is designed to fix an edge of a top fabric to a top frame and bring the edge into contact with a weather strip attached to the top frame so as to ensure an adequate sealing performance. This sealing mechanism can ensure a required sealing performance in a relatively simplified structure without a particular problem.

Japanese Patent Laid-Open Publication No. 08-207595 discloses a convertible top which comprises a top frame designed to be retracted in a folded state and deployed from the folded state in conjunction with a stretch motion of a given member, and a top fabric attached to the top frame. In this convertible top, an edge of the top fabric is not entirely fixed to the top frame due to the folding mechanism of the top frame. More specifically, in this convertible top, while a front end and a rear edge of the top fabric are fixed, respectively, to the top frame and an edge of a vehicle-body opening, opposite lateral edges of an intermediate portion of the top fabric, i.e. a portion of the top fabric extending along a door opening, are not fixed to the top frame.

Based on the above structure, this sealing mechanism is designed to move the non-fixed portion of the top fabric toward the top frame and bring the non-fixed portion into contact with the top frame during movement of the convertible top from a retracted position to a deployed position, and to gradually move the non-fixed portion away from the top frame during movement of the convertible top from the deployed position to the retracted position. Thus, it is not easy to adequately seal between the lateral edges of the top fabric and the top frame in the deployed position.

As measures for ensuring an adequate sealing performance in this type of convertible top, various sealing mechanisms have been proposed. For example, the above Japanese Patent Laid-Open Publication No. 08-207595 discloses a sealing mechanism comprising a pulling wire attached along each lateral edge of a top fabric. This sealing mechanism is designed to tension the pulling wire by a deploying force of the top frame so as to enforcedly pulling the lateral edge toward the top frame in such a manner that the pulled lateral edge of the top fabric is led into a receiving groove formed on the side of the top frame and then brought into contact with a weather strip fitted in the receiving groove, to adequately seal between the top frame and the lateral edge of the top fabric.

This type of sealing mechanism is widely used in a convertible top having a structure where lateral edges of a top fabric are not fixed to a top frame.

Japanese Utility Model Laid-Open Publication No. 02-019627 discloses, but does not relate to sealing between a top frame and a lateral edge of a top fabric, a mechanism for sealing between an edge of a roof opening of a vehicle body and a movable roof attached to the opening and adapted to open and close the opening. This sealing mechanism is designed to bring the movable roof into press contact with a weather strip attached along each lateral edge of the opening, from outside.

The sealing mechanism designed to lead each lateral edge of a top fabric into a receiving groove formed on the side of a top frame and then bring the lateral edge into contact with a weather strip fitted in the receiving groove, as disclosed in the Japanese Patent Laid-Open Publication No. 08-207595, can adequately seal between the top frame and the lateral edge of the top fabric when a convertible top is in a deployed position. However, during movement of the convertible top from the deployed position to a retracted position, a frictional resistance between the receiving groove and the lateral edge of the top fabric is likely to cause difficulty in releasing the lateral edge of the top fabric from the receiving groove, and hinder an adequate movement of the convertible top.

As one solution against this problem, it is contemplated to employ a technique of bringing the lateral edge of the top fabric into press contact with a weather strip from outside, as disclosed in the Japanese Utility Model Laid-Open Publication No. 02-019627. While this technique is effective if both members to be bought into contact with one another have high rigidity, it is not effective in sealing between a top frame having high rigidity and a lateral edge of a top fabric having low rigidity. Thus, this technique cannot be employed in a mechanism for sealing between a top frame and a top fabric.

SUMMARY OF THE INVENTION

In view of the above circumstances, it is an object of the present invention to provide a sealing mechanism for a convertible top of a vehicle, capable of ensuring high-level sealing between a top frame and a top fabric in a lateral edge of the convertible top.

In order to achieve the above object, the present invention provides a sealing mechanism for a convertible top of a vehicle, the convertible top including a deployable/retractable top frame having a side frame adapted to be disposed along an edge of an door-glass opening of a vehicle body to extend surroundingly from an upper edge to an rear edge of the door-glass opening, and a top fabric covering the top frame from outside. The convertible top is adapted to be selectively moved between a deployed position for closing a passenger-compartment opening and a retracted position for opening the passenger-compartment opening. The sealing mechanism is operable, in the deployed position, to bring a lateral edge of a side zone of the top fabric into contact with a weather strip attached to the side frame of the top frame so as to seal therebetween. The sealing mechanism comprises a sealing cloth disposed inside the lateral edge of the side zone of the top fabric in such a manner as to be gradually inclined toward the laterally inward side of the convertible top, as going from a front side to a rear side in a deployment direction of the convertible top. The sealing cloth is designed to be brought into contact with the weather strip in the deployed position.

In the sealing mechanism of the present invention, the sealing cloth is disposed inside the lateral edge of the side zone of the top fabric in such a manner as to be gradually inclined toward the laterally inward side of the convertible top, as going from a front side to a rear side in a deployment direction of the convertible top. Further, the sealing cloth is designed to be brought into contact with the weather strip in the deployed position. Thus, during a movement of the convertible top from the retracted position to the deployed position, the sealing cloth is brought into contact with the top weather strip, and a resulting contact region therebetween is gradually displaced toward the laterally inward side of the convertible top according to the inclined sealing cloth. That is, the sealing cloth serves as a wedge. Thus, the contact becomes stronger along with the movement to provide a high surface pressure in the contact region between the sealing cloth and the weather strip. This makes it possible to ensure high-level sealing between the sealing cloth and the weather strip.

During the movement of the convertible top from the deployed position to the retracted position, the inclined sealing cloth allows the surface pressure between the sealing cloth and the weather strip to be gradually reduced. This makes it possible to readily release the lateral edge of the side zone 22 of the top fabric from the weather strip so as to provide a smooth movement of convertible top toward the retracted position.

Thus, the sealing mechanism of the present invention can achieve both high-level sealing in the deployed position and a smooth movement of convertible top toward the retracted position, and contribute to drastic improvement in a commercial value of the convertible top.

These and other objects, features, and advantages of the present invention will become apparent upon reading of the following detailed description along with the accompanied drawings.

DETAILED DESCRIPTION OF THE PREFERRED EMBODIMENTS

A preferred embodiment of the present invention will now be specifically described based on the drawings.

Figure 1:
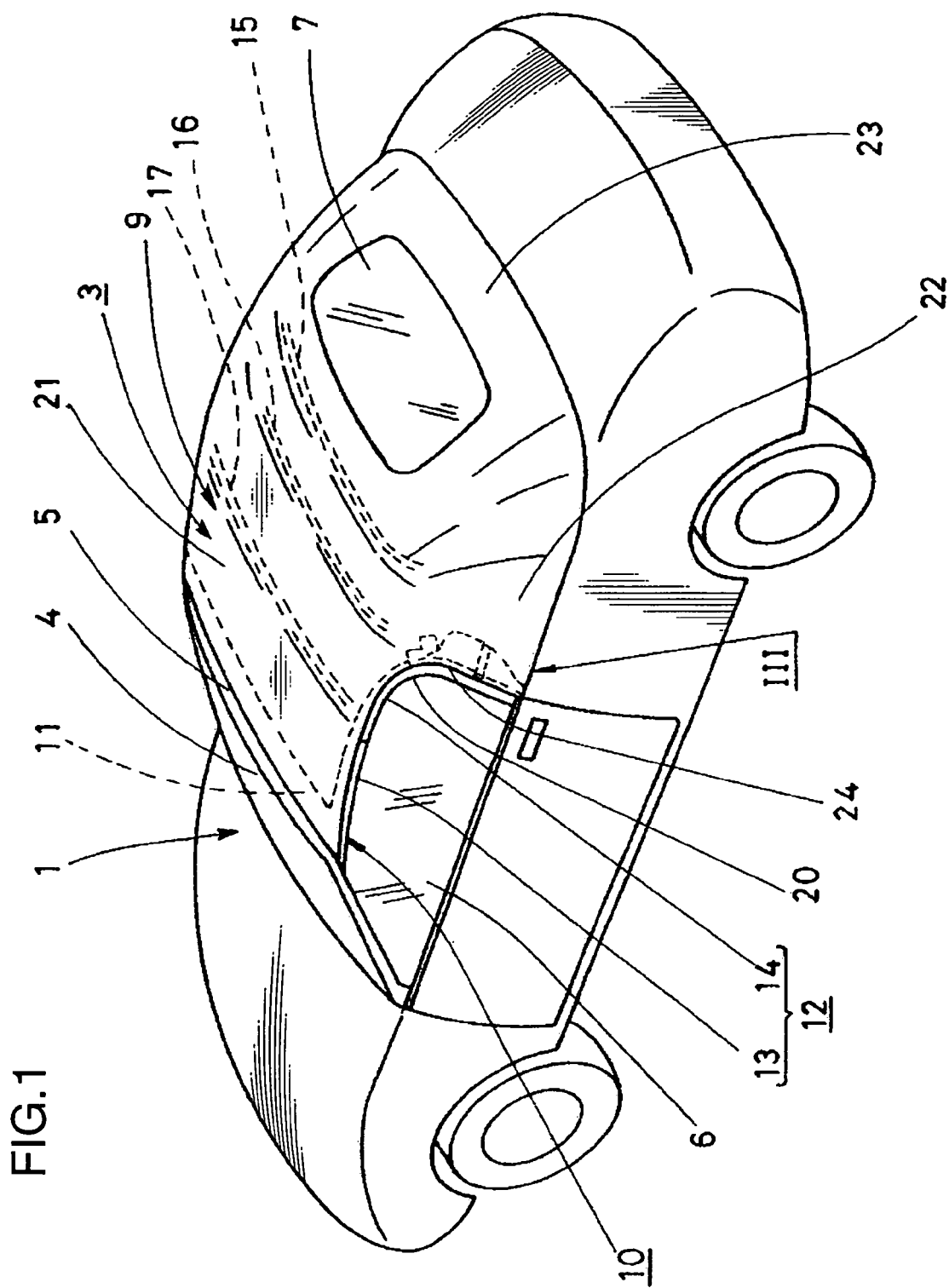
FIG. 1 is a perspective view showing a vehicle equipped with a convertible top employing a sealing mechanism according one embodiment of the present invention, wherein the vehicle in a closed state.
Figure 2:
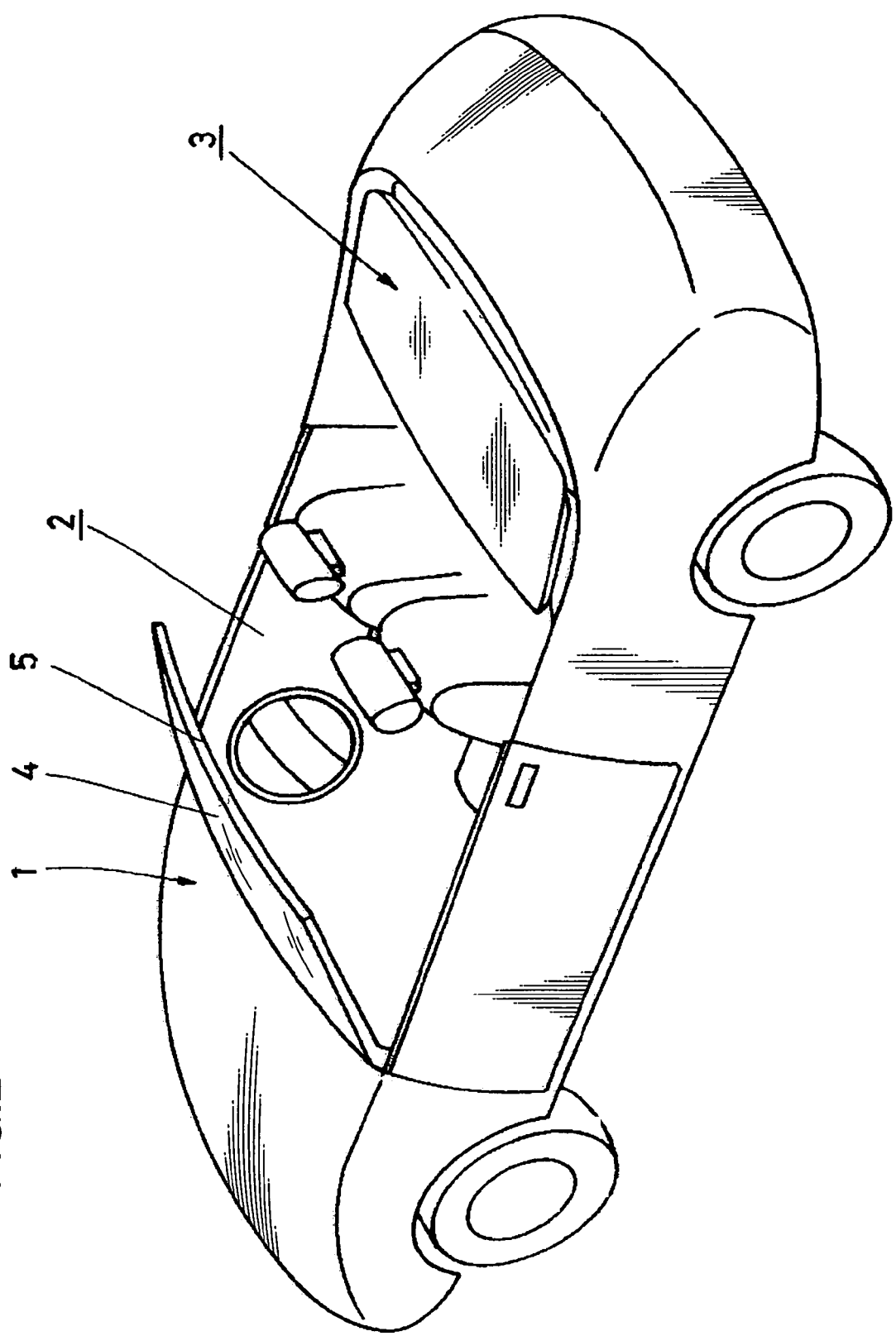
FIG. 2 is a perspective view showing the vehicle in an open state.

FIGS. 1 and 2 show a vehicle equipped with a convertible top 3 for covering a passenger-compartment opening 2 of a vehicle body 1 from above. The convertible top 3 is designed to be selectively deployed and retracted. That is, the convertible top 3 can be set in a deployed position to allow the vehicle to have a closed state in which the passenger-compartment opening 2 is covered by the convertible top 3, as shown in FIG. 1. The convertible top 3 can also be set in a retracted position to allow the vehicle to have an open state in which the convertible top 3 is removed from above the passenger-compartment opening 2, and the passenger-compartment opening 2 is opened, as shown in FIG. 2. In the open state, the convertible top 3 is retracted in a rear end of a passenger compartment.

The convertible top 3 comprises a top frame 10, and a top fabric 9 attached to the top frame 10 to cover the top frame 10 from outside.

The top frame 10 includes a front frame 11 disposed at a front edge thereof to extend in a width or lateral direction of the vehicle body 1 and adapted to be detachably fastened to a front header 5 fixed to an upper edge of a front windshield 4, a pair of right and left side frames 12 fixed, respectively, to right and left ends of the front frame 11 and adapted to extend curvedly along an edge of a door-glass opening 20 of the vehicle body 1, a control link 18 (see FIG. 3) for controlling a folding movement of a front side frame 13 and a rear side frame 14 which make up each of the side frames 12, a plurality (three in this embodiment) of bows or beams 15 to 17 each bridged between the right and left side frames 12 and arranged in parallel relation to each other in a frontward/rearward or longitudinal direction of the vehicle body 1.

Figure 4A:
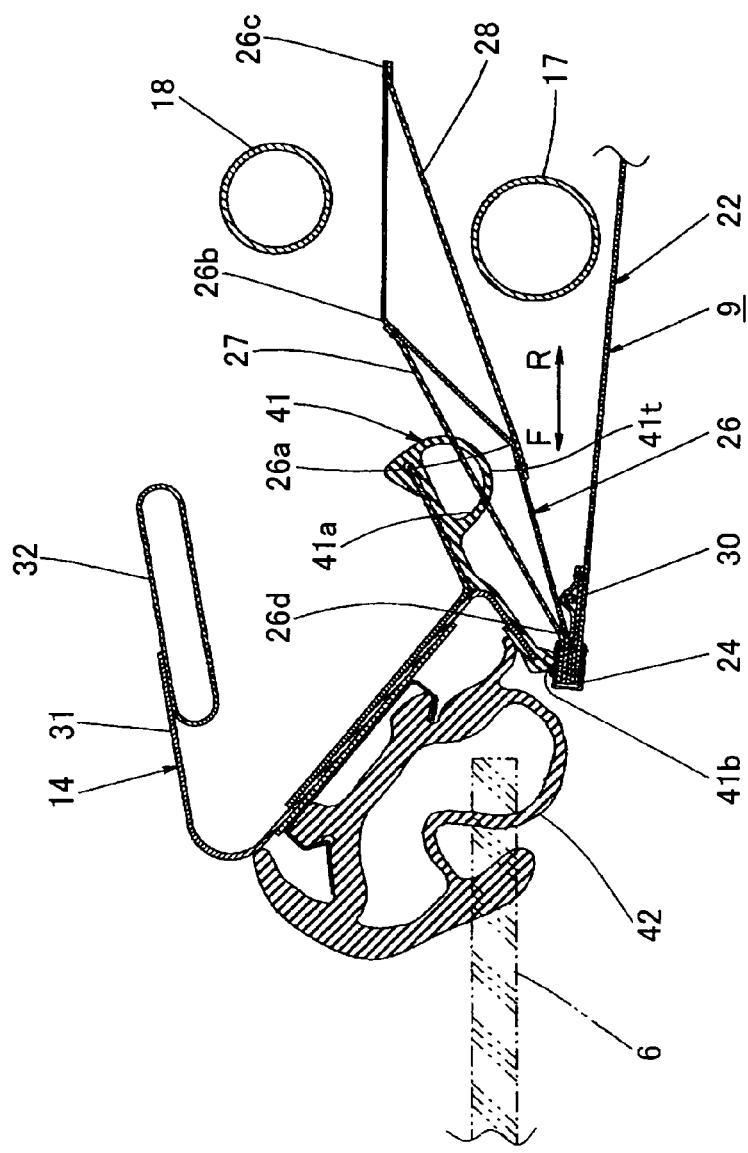
FIG. 4A is an explanatory sectional view taken along the line IV—IV in FIG. 3.

Among the front and rear side frames 13, 14 making up each of the side frames 12, the front side frame 13 is located closer to the front frame 11 and formed in an approximately linear shape in conformity to a front region of the upper edge of the door-glass opening 20. The rear side frame 14 is connected to a rear end of the front side frame 13 in a rotatable manner relative to the front side frame 13, and formed in an approximately right-angled curved shape in conformity to a rear region of the upper edge of the door-glass opening 20 and a rear edge of the door-glass opening 20 extending vertically or downward from an rear end of the upper edge As shown in FIG. 4A, each of the front and rear side frames 13, 14 of the side frame 12 comprises a curved rail member 31 formed in an approximately U shape through a bending process, and a flat pipe member 32 fixed to one end of the curved rail member 31. A top weather strip 41 (corresponding to "weather strip (41)" in the appended claims) and a weather strip 42 for the door glass 6 are attached to an outer surface of the curved rail member 31.

The top fabric 9 is attached to the top frame 10 to cover the top frame 10 from outside. The top fabric 9 has a roof zone 21 adapted to form a ceiling of the passenger compartment, a pair of right and left side zones each adapted to be disposed rearward relative to the door-glass opening 20 so as to form a side surface of the passenger compartment, and rear zone 23 adapted to be disposed at the rear end of the passenger compartment so as to form a rear surface of the passenger compartment and provided with a rear window glass 7 in an central region thereof.

A front edge of the roof zone 21 of the top fabric 9 is fixed to the front frame 11, and each of opposite side edges of a front region of the roof zone 21 is fixed to the front side frame 13 of the corresponding side frame 12. Respective lower edges of the rear zone 23 and the side zones 22 are fixed to the vehicle body 1.

The remaining regions of the roof zone 21, i.e. each region of the roof zone 21 adapted to be disposed in opposed relation to the rear side frame 14 of the corresponding side frame 12 and each region of the side zones adapted to be disposed in opposed relation to the rear side frame 14 of the corresponding side frame 12 are not connected to the side frames 12 and the vehicle body 1 (these regions will hereinafter be referred to as "non-connected region(s)").

That is, each of these non-connected regions is in contact with the side frame 12 when the convertible top 3 is in the deployed position, and located apart from the side frame 12 when the convertible top 3 is in the retracted position. Thus, it is required to ensure adequate sealing between the side frame 12 and the lateral edge of the top fabric 9, particularly, in the deployed position.

A pull-in wire 30 (see FIGS. 3 and 4) is attached to the lateral edge of the top fabric 9 adapted to be disposed along the side frame 12, over the entire length thereof. The pull-in wire 30 has one end fixed to the front side frame 13 and the other end fixed to the lower end of the rear side frame 14. In conjunction with a deployment movement of the top frame 10, a tensile force is generated between the opposite ends of the pull-in wire 30. Thus, the lateral edge of the top fabric 9 is pulled toward the front side frame 13 and the rear side frame 14 and brought into contact with the top weather strip 41 fixed to the front side frame 13 and the rear side frame 14.

While this pull-in action of the pull-in wire 30 is significantly effective in a corner region of the rear side frame 14 because a pull-in force is applied toward the inside of the corner, it is insufficient in the lateral edge of the side zone 22 of the top fabric 9 because a pull-in force is applied along or in a direction parallel to the lateral edge of the side zone 22. That is, this pull-in force is insufficient to desirably press the lateral edge of the side zone 22 to the top weather strip 41. In addition, the lateral edge of the side zone 22 is not connected to the rear side frame 14 or in a free state. This becomes one negative factor in lowering the action of pressing the edge of the side zone 22 to the top weather strip 41.

In order to adequately seal the lateral edge of the side zone 22 of the top fabric 9, the sealing mechanism according to this embodiment employs the following unique structure. This unique structure will be specifically described with reference to FIGS. 3 and 4.

Figure 3:
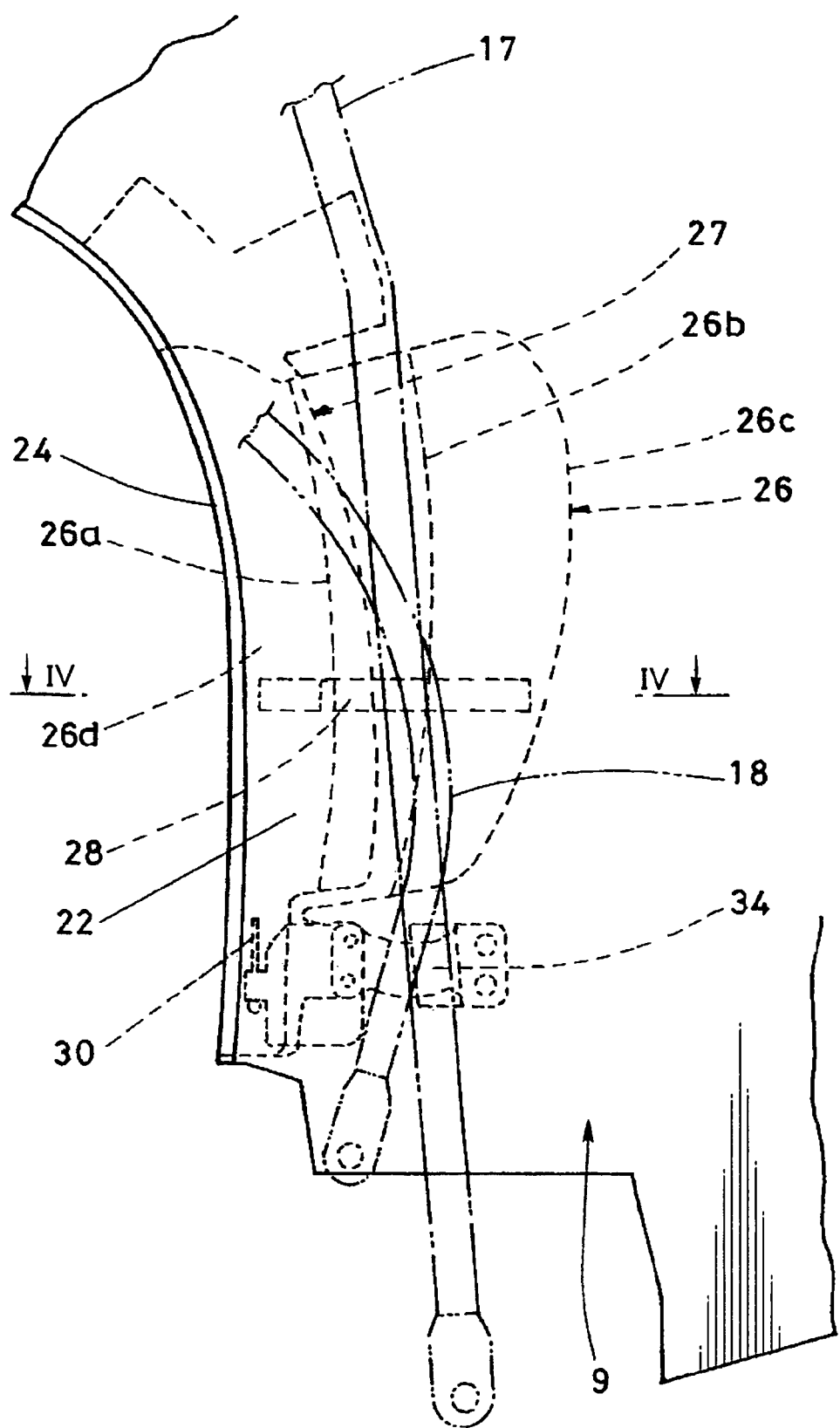
FIG. 3 is an enlarged view of the region III in FIG. 1

FIG. 3 is a side view showing the lateral edge region of the side zone 22 of the top fabric 9. FIG. 4A is an explanatory sectional view taken along the line IV—IV in FIG. 3, which shows a sectional structure of the lateral edge of the side zone 22.

An edge of a reinforcing plate 26 having a size capable of covering over the lateral edge of the side zone 22 and an edge of a strip-shaped sealing cloth 27 having a given width and extending along the lateral edge are sewn together with the lateral edge of the side zone 22 in a superimposed manner, as shown in FIG. 4A, to form a bound portion 24. Thus, this bound portion 24 serves as the lateral edge of the side zone 22. In this case, the pull-in wire 30 to be attached to the lateral edge of the side zone 22 is sewn on a region of the side zone 22 adjacent to the bound portion 24 to extend along the bound portion 24.

The reinforcing plate 26 is prepared by cutting a thin resin plate into an approximately elongated-rectangular shape and bending the obtained plate at an adequate angle toward obverse and reverse sides, respectively, at two positions located in a direction of a short edge (or a direction approximately orthogonal to the bound portion 24). In this embodiment, the reinforcing plate 26 is bent in such a manner that a concave surface (or bottom side) at a first bent point 26a located closer to the bound portion 24 is oriented to the passenger compartment, and a convex surface (or peak side) at a second bent point 26b located farther away from the bound portion 24 is oriented to the passenger compartment.

As shown in FIG. 3, the reinforcing plate 26 has a lower end connected to the third beam 17, and a position of the reinforcing plate 26 relative to the third beam 17 with respect to a direction approximately perpendicular to the convertible top is fixed by this connection. In this embodiment, the reinforcing plate 26 is disposed in such a manner as to be gradually inclined toward the inward side of the convertible top as coming closer to a distal end 26c on the basis of a fixed point 26d of the bound portion 24. The arrow F-R in FIG. 4A indicates a moving direction of the convertible top 3 during deploying/retracting operations.

Figure 4B:
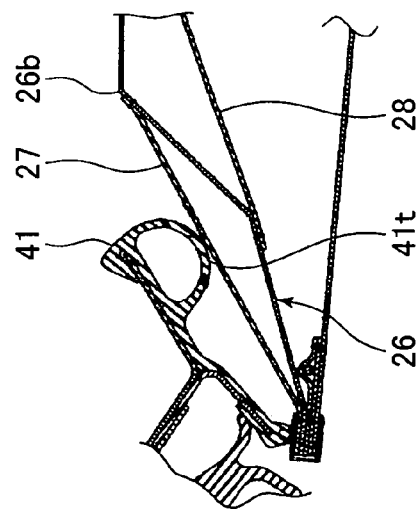
FIG. 4B is a view showing a contacting state between the weather strip and the sealing cloth.

As shown in FIG. 4A, the sealing cloth 27 is disposed on the side of the surface of the reinforcing plate 26 oriented to the passenger compartment or the concave surface of the reinforcing plate 26. The sealing cloth 27 has one end fixed to the bound portion 24 together with the end 26d of the reinforcing plate 26, and the other end sewn on and fixed to the second bent point 26b across the first bent point 26a. In this embodiment, the sealing cloth 27 is fixed to the reinforcing plate 26 in such a manner as have a flat shape in a tensioned condition by the action of a given tensile force based on resilience or an elastic restoring force of the reinforcing plate 26. This tensioned condition of the sealing cloth 27 is adjusted to allow the sealing cloth 27 to be appropriately pressed against a ring portion 41a of the top weather strip 41 fixed to the rear side frame 14, when the convertible top 3 is set in the deployed position (the state illustrated in FIG. 4A). It should be noted that the top portion 41t of the ring portion 41a is shown to be breaking into the surface of the sealing cloth 27 (i.e., the top portion 41t is inside of the triangle 26d-26a-26b) in FIG. 4A; however, this is for the illustration purpose only. In reality, the protruding top portion 41t of the weather strip 41 is in pressed state against the tensioned surface of the sealing cloth 27 as shown in FIG. 4B.

Further, a band 28 is attached around the first bent point 26a and at the distal end 26c of the reinforcing plate 26 to extend therebetween in a tensioned condition.

The above sealing mechanism makes it possible to ensure high-level sealing between the rear side frame 14 and the lateral edge of the side zone 22 of the top fabric 9 when the convertible top 3 is set in the deployed position, and achieve a smooth movement of the convertible top 3 from the deployed position to the retracted position, as described below.

During the movement of the convertible top 3 from the retracted position to the deployed position, the side zone 22 of the top fabric 9 is moved in the direction indicated by the arrow F in FIG. 4A in conjunction with the deployment movement of the top frame 10, and stopped while allowing the bound portion 24 to be in contact with a lip portion 41b formed in one end of the top weather strip 41. The sealing cloth 27 fixed to the top fabric 9 has a rear region relative to the moving direction (direction indicated by the arrow F-R), or a longitudinally rear region, inclined laterally inward. In this inclined posture, the sealing cloth 27 is brought into contact with the ring portion 41a of the top weather strip 41. Thus, this inclined sealing cloth 27 allows a contact region between the sealing cloth 27 and the ring portion 41a to be gradually displaced toward the laterally inward side of the convertible top. That is, the sealing cloth 27 serves as a wedge. According to this wedge function, the sealing cloth 27 is moved in the direction indicated by the arrow F while gradually increasing a pressing force against the ring portion 41a of the top weather strip 41. Then, at the stopped position illustrated in FIG. 4A, a high surface pressure between the sealing cloth 27 and the ring portion 41a of the top weather strip 41 is created to achieve high-level sealing therebetween.

While the sealing cloth 27 is curvedly deformed due to the contact with the ring portion 41a of the top weather strip 41, the reinforcing plate 26 is also curvedly deformed in conjunction with the curved deformation of the sealing cloth 27, and a resulting elastic restoring force of the reinforcing plate 26 provides a tensile force to the sealing cloth 27. Thus, even if the sealing cloth 27 is curvedly deformed, the tensioned condition of the sealing cloth 27 and the surface pressure between the sealing cloth 27 and the top weather strip 41 is ensured to allow the high-level sealing to be maintained.

The band 28 fixed to the reinforcing plate 26 prevents the reinforcing plate 26 from excessively bending from the first bent point 26a toward the sealing cloth 27 in conjunction with the contact of the sealing cloth 27 with the top weather strip 41, and causing deterioration in tensile force of the sealing cloth 27. This makes it possible to adequately maintain the surface pressure between the sealing cloth 27 and the ring portion 41a of the top weather strip 41 so as to allow the high-level sealing to be maintained.

As mentioned above, the sealing mechanism additionally provided with the sealing cloth 27, the reinforcing plate 26 and the band 28 makes it possible to provide drastically enhanced sealing between the sealing cloth 27 and the ring portion 41a of the top weather strip 41.

During the movement of the convertible top 3 from the deployed position to the retracted position, the inclined sealing cloth 27 allows the surface pressure between the sealing cloth 27 and the ring portion 41a of the top weather strip 41 to be gradually reduced. This makes it possible to readily release the sealing cloth 27 from the top weather strip 41 so as to provide a smooth movement of convertible top 3 toward the retracted position.

In sum, the present invention provides a sealing mechanism for a convertible top of a vehicle, the convertible top including a deployable/retractable top frame having a side frame adapted to be disposed along an edge of an door-glass opening of a vehicle body to extend surroundingly from an upper edge to an rear edge of the door-glass opening, and a top fabric covering the top frame from outside. The convertible top is adapted to be selectively moved between a deployed position for closing a passenger-compartment opening and a retracted position for opening the passenger-compartment opening. The sealing mechanism is operable, in the deployed position, to bring a lateral edge of a side zone of the top fabric into contact with a weather strip attached to the side frame of the top frame so as to seal therebetween. The sealing mechanism comprises a sealing cloth disposed inside the lateral edge of the side zone of the top fabric in such a manner as to be gradually inclined toward the laterally inward side of the convertible top, as going from a front side to a rear side in a deployment direction of the convertible top. The sealing cloth is designed to be brought into the weather strip in the deployed position.

The sealing mechanism of the present invention may include a reinforcing plate disposed inside the lateral edge of the side zone of the top fabric. In this case, the sealing cloth may be fixed to the reinforcing plate across a concave surface of the reinforcing plate.

Further, the above sealing mechanism may include a bending restriction member attached to the reinforcing plate and adapted to restrict bending of the reinforcing plate toward the concave surface.

The present invention can provide the following effects.

(a) In the sealing mechanism of the present invention, the sealing cloth is disposed inside the lateral edge of the side zone of the top fabric in such a manner as to be gradually inclined toward the laterally inward side of the convertible top, as going from a front side to a rear side in a deployment direction of the convertible top. Further, the sealing cloth is designed to be brought into the weather strip in the deployed position. Thus, during a movement of the convertible top from the retracted position to the deployed position, the sealing cloth is brought into contact with the top weather strip, and a resulting contact region therebetween is gradually displaced toward the laterally inward side of the convertible top according to the inclined sealing cloth. That is, the sealing cloth serves as a wedge. Thus, the contact becomes stronger along with the movement to provide a high surface pressure in the contact region between the sealing cloth and the weather strip. This makes it possible to ensure high-level sealing between the sealing cloth and the weather strip.

During the movement of the convertible top from the deployed position to the retracted position, the inclined sealing cloth allows the surface pressure between the sealing cloth and the weather strip to be gradually reduced. This makes it possible to readily release the lateral edge of the side zone 22 of the top fabric from the weather strip so as to provide a smooth movement of convertible top toward the retracted position.

Thus, the sealing mechanism of the present invention can achieve both high-level sealing in the deployed position and a smooth movement of convertible top toward the retracted position, and contribute to drastic improvement in a commercial value of the convertible top.

(b) The sealing mechanism of the present invention may include a reinforcing plate disposed inside the lateral edge of the side zone of the top fabric, and the sealing cloth may be fixed to the reinforcing plate across a concave surface of the reinforcing plate. In this case, when the sealing cloth is curvedly deformed due to the contact between the sealing cloth and the weather strip, the sealing cloth is tensioned by a given tensile force based on an elastic restoring force of the reinforcing plate. Thus, even if the sealing cloth is curvedly deformed, a high surface pressure between the sealing cloth and the weather strip is ensured to allow the effect of providing high-level sealing as described in the above (a) to be accelerated.

(c) The above sealing mechanism may further include a bending restriction member attached to the reinforcing plate and adapted to restrict bending of the reinforcing plate toward the concave surface. In this case, the bending restriction member prevents the reinforcing plate from excessively bent (or deterioration in tensile force of the sealing cloth) in conjunction with the contact of the sealing cloth with the weather strip. This makes it possible to further reliably obtain the above effect (b) from the reinforcing plate.

This application is based on Japanese Patent Application Serial No. 2005-046446, filed in Japan Patent Office on Feb. 23, 2005, the contents of which are hereby incorporated by reference.

Although the present invention has been fully described by way of example with reference to the accompanying drawings, it is to be understood that various changes and modifications will be apparent to those skilled in the art. Therefore, unless otherwise such changes and modifications depart from the scope of the present invention hereinafter defined, they should be construed as being included therein.

What is claimed is:

1. A sealing mechanism for a convertible top of a vehicle, said convertible top including a deployable-and-retractable top frame having a side frame adapted to be disposed along an edge of an door-glass opening of a vehicle body to extend surroundingly from an upper edge to an rear edge of said door-glass opening, and a top fabric covering said top frame from outside, said convertible top being adapted to be selectively moved between a deployed position for closing a passenger-compartment opening and a retracted position for opening said passenger-compartment opening, said sealing mechanism being operable, in said deployed position, to bring a lateral edge of a side zone of said top fabric into contact with a weather strip attached to said side frame of said top frame so as to seal therebetween, said sealing mechanism comprising:

a sealing cloth disposed inside the lateral edge of the side zone of said top fabric in such a manner as to be gradually inclined toward the laterally inward side of said convertible top, as going from a front side to a rear side in a deployment direction of said convertible top, said sealing cloth being designed to be brought into contact with said weather strip in said deployed position.

2. The sealing mechanism as defined in claim 1, which includes a reinforcing plate disposed inside the lateral edge of the side zone of said top fabric, wherein said sealing cloth is fixed to said reinforcing plate across a concave surface of said reinforcing plate.

3. The sealing mechanism as defined in claim 2, which includes a bending restriction member attached to said reinforcing plate and adapted to restrict bending of said reinforcing plate toward said concave surface.

* * * * *